United States Patent Office 3,397,170
Patented Aug. 13, 1968

3,397,170
BLACK ACETAL RESIN COMPOSITIONS
Robert Fourcade, Gosnay, and Thérèse Van De Walle, Lievin, France, assignors to Houilleres du Bassin du Nord & du Pas-de-Calais, Douai, Nord, France, a French establishment
No Drawing. Filed Nov. 3, 1964, Ser. No. 408,691
Claims priority, application France, Nov. 4, 1963, 952,555
1 Claim. (Cl. 260—37)

ABSTRACT OF THE DISCLOSURE

High molecular weight polyoxymethylene compositions in which is incorporated from 0.1 to 1.5% by weight of carbon black and from 0.2 to 2.0% by weight of diphenylamine or N-phenyl-beta-naphthylamine.

It is known that the thermoplastic resins of the acetal type $(C-CH_2-)_n$ must be protected against several phenomena in order to be used for industrial purposes.

To avoid a degradation of the chain ends, these resins are treated by etherification or acylation.

To avoid cleavage in the middle of the chain, it has been observed that the presence of several derivatives is useful, and in particular the presence of certain derivatives of amides, it has also been shown that the presence of substances, called anti-oxidants is necessary to prevent oxidation.

These anti-oxidant products are generally of the phenolic type, among which the following can be cited:

bis-(2-hydroxy-3-tertiarybutyl-5-methyl phenyl)methane;
1,1-bis-(4-hydroxy - 2-methyl - 5-tertiarybutyl phenyl)-butane;
1,1 - bis-(4-hydroxy - 2-methyl-5-tertiarybutyl phenyl)-ethane;
bis-(2-hydroxy-3-tertiarybutyl-5-ethyl phenyl)methane.

The applicant has observed that the acetal resins containing such products can be used only in their natural color.

In particular, the numerous attempts applicant has made to pigment these resins with black pigments have all given poor results. In fact it has been noticed that the addition of carbon black, such as it can be found on the market, causes strong decomposition of the resins thereby creating an extensive liberation of monomeric formaldehyde. Extruding processes are then very dangerous for the workers because of the risks of explosion in the tube of the extruding machine.

But the applicant has observed that the use of an antioxidant of a basic type such as N-phenyl-beta-naphthylamine or diphenylamine, which cannot be used with acetal resins of a natural color, namely white, because they produce a strong yellowish color, is, in contrast, remarkedly efficient when used with black pigments.

A curious observation has been made that when carbon black and a basic anti-oxidant are simultaneously present: the product thus obtained is perfectly stable and of the black color desired.

In order to illustrate the invention, the following examples are given but they are in no way limitative.

Example 1

Polyoxymethylene resins acetylated at the end of chain; grade 3; this resin has been prepared as indicated in the pending United States application Ser. No. 404,499, filed Oct. 16, 1964 having for title "Stabilisation of Polyoxymethylenes" in the name of Theresa Van de Walle and Michel Brault.

There is added to this resin:

0.8% of terpolymer (38% of polycaprolactame—35% polyhexamethylene adipamide—27% polyoxamethylene-sebacamide)
0.5% of 1,1-bis(4-hydroxy - 2-methyl - 5-tertiarybutyl-phenyl) butane, without addition of carbon black.

The loss in weight in half on hour at 222° C. is 0.40%. This loss in weight is measured in conformity with the method described by the applicants in its above mentioned patent application.

Example 2

The resin and the adjuvants used are the same as in Example 1, and 0.25% of the carbon black pigment called "140 Black densed" of the Columbian Carbon International is added.

Loss in weight in half an hour at 222° C.=12%.

Example 3

Same resin as that used in Example 1, to which are added:

0.8% of the terpolymer
0.5% of N-phenyl-beta-naphthylamine
No addition of carbon black.

Loss in weight in half an hour at 222° C.=0.7% besides, the test-tube gets distinctly yellowish.

Example 4

Same resin and same adjuvants as those used in Example 3, to which is added:

0.25% of the "140 Black densed" pigment of the Columbian Carbon International

Loss in weight in half an hour at 222° C.=0.35%

Example 5

The resin used has been produced by the same process as under Example 1, but is of grade 15 instead of grade 3. Addition of:

1.5% of the product called "Versamid 940" described in U.S. Patent 3,306,953 dated Feb. 28, 1967;
and 0.5% of N-phenyl-beta-naphthylamine+0.3% "Statex Black F.12" (Columbian Carbon International).

Loss in weight in half an hour at 222° C.=0.26%.

Example 6

Same resin as that used in Example 5, to which are added:

1.5% "Versamid 940",
and 0.5% N-phenyl-beta-naphthylamine+0.3% "Monarch Black 71" of the Cabot Corporation.

Loss in weight in half an hour at 222° C.=0.31%.

Example 7

Same resin as that used in Example 5, to which are added:

1.5% "Versamid 940"
0.45% of diphenylamine
and 0.3% "Monarch Black 71" of the Cabot Corporation.

Loss in weight in half an hour at 222° C.=0.29%.

Example 8

Same resin as that used in Example 5, to which are added:

1.5% of the polyesteramide of the following type:

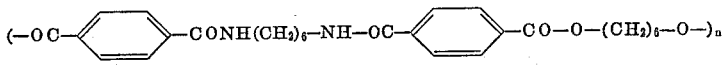

0.5% of diphenylamine,
and 0.6% of carbon black "Nubian" type of the Columbian Carbon International.

Loss in weight in half an hour at 222° C.=0.04%.

A comparative study of these examples brings out the fact that the presence of carbon black in a given composition containing basically phenolic anti-oxidant results in a very substantial increase in the instaibility of these compositions.

On the other hand, in the compositions of the present invention which contain basic anti-oxidants that cannot be used alone because of the marked yellowish color they impart, the addition of carbon black keeps the composition from getting yellowish and it greatly increases the stability of the composition.

In fact, the black substance protects the basic anti-oxidant and the latter increases the stability of the composition.

Tests conducted with other acylated polyoxymethylenes have given quite comparable results.

What we claim is:
1. High molecular weight polyoxymethylene in which is incorporated from 0.1 to 1.5% by weight of carbon black and from 0.2 to 2.0% by weight of a member of the group consisting of diphenylamine and N-phenyl-beta-naphthylamine.

References Cited

UNITED STATES PATENTS

| | | | |
|---|---|---|---|
| 3,087,911 | 4/1963 | Ainsworth | 260—45.9 |
| 3,262,911 | 7/1966 | Hay | 260—37 |
| 3,267,068 | 8/1966 | Perry | 260—37 |

MORRIS LIEBMAN, *Primary Examiner.*

L. T. JACOBS, *Assistant Examiner.*